Aug. 4, 1959  R. M. MILLER ET AL  2,898,232
ROOFING GRANULES AND METHOD FOR MAKING
Filed June 14, 1956
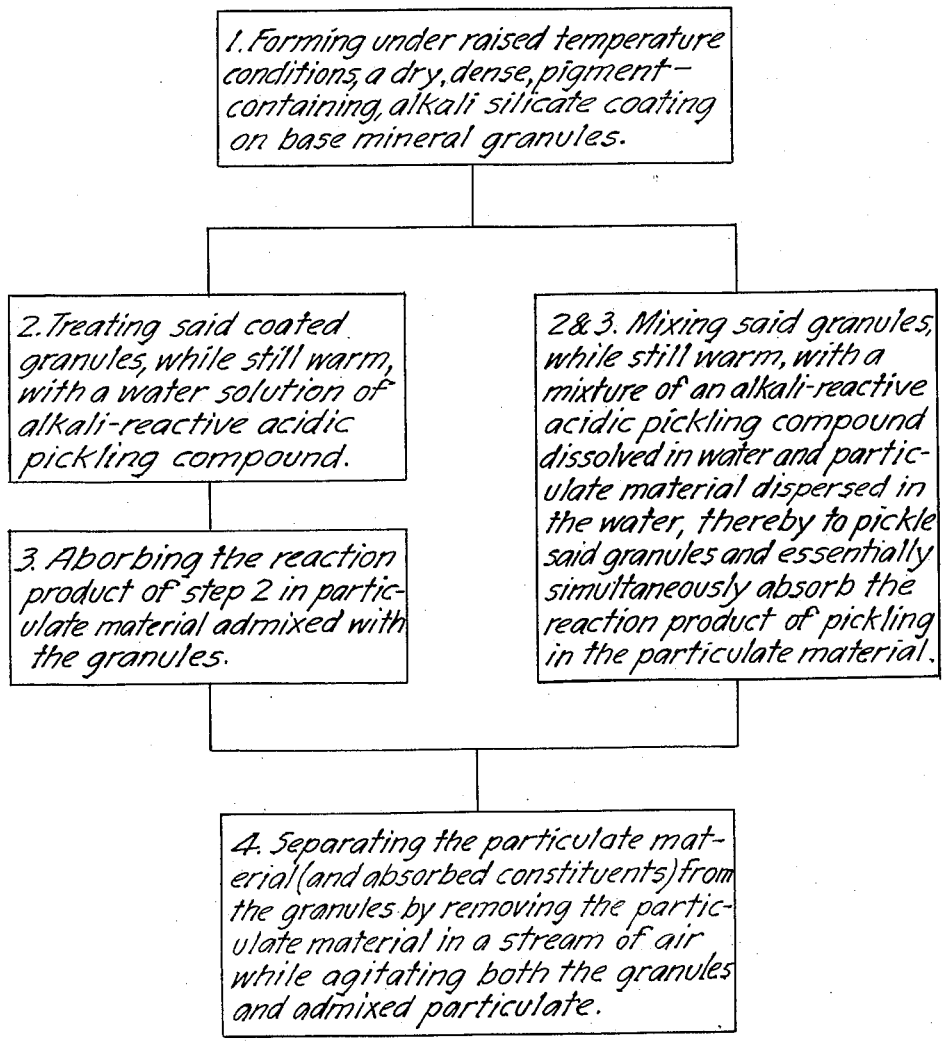

United States Patent Office 2,898,232
Patented Aug. 4, 1959

2,898,232

ROOFING GRANULES AND METHOD FOR MAKING

Robert M. Miller, Houston, Tex., and James R. Lodge and Merle C. Merwin, St. Paul, Minn., assignors to Minnesota Mining and Manufacturing Company, St. Paul, Minn., a corporation of Delaware Application June 14, 1956, Serial No. 591,282

5 Claims. (Cl. 117—100)

This invention relates to improvements in coated mineral granules, certain sheet structures, and more particularly, relates to a new process for making improved color coated roofing granules in a very economical manner. Granules prepared according to our process exhibit generally improved intensity of color, resistance to weathering and blooming, and improved adhesion to asphalt.

Coated granules partially embedded in a plastic bituminous backing member so as to form a surface layer thereupon have found extensive use as decorative and protective elements for roofing and siding. Because of consumer demand for varied hues and colors in these elements, there has been developed a technique for their manufacture which avoids burn-out or other heat alteration of sensitive color pigments, e.g., organic pigments, in their coatings. In this well-known method, a coating of a mixture of a suitable pigment and a soluble silicate binder on the granules is dried at a raised temperature below about 600° F., and thereafter, given a chemical treatment in order to insolubilize the soluble silicate.

When roofing granules are manufactured on a commercial scale using the foregoing method, much of the water-soluble products formed as a result of the chemical insolubilization treatment are retained on their surfaces, and interfere in varying and frequently unpredictable degree with the desired performance properties of the granules. For example, some chemical insolubilization treatments cause an objectionable dull or hazy film over the colored surfaces. Sometimes chemically insolubilized granule coatings exhibit poor resistance to blooming.

In many cases the products of chemical insolubilization on the surface of a coated granule interfere with asphalt adhesion. During the manufacture of bituminous roofing and siding, colored surface coated granules usually are applied in a layer over the surface of a heated asphalt coated fibrous sheet, and pressed into place by rollers. Water is then sprayed over the sheet to cool and harden the asphalt binder prior to cutting and packing the finished roofing. If the granules used have a considerable portion of the water-soluble salts formed by chemical insolubilization upon their surfaces, such may cause significant amounts of water to be picked up and to spread around the surface coatings by capillary action, thus interfering with asphalt adhesion not only during manufacture of the sheet article but also during later periods of use.

It has been indicated in the prior art that water-soluble constituents might be removed from a granule coating by water washing. Usually, however, an amount of water in excess of 200–300 pounds per ton of granules is needed to remove the water-soluble salts of chemical insolubilization, which salts vary generally from about 5 to about 15 pounds per ton. Furthermore, after such a washing step, heating of the granules is usually necessary in order to dry them, since they are cooled by the large volume of water used in washing, and then retain an amount of water between about 150 and 250 pounds per granule ton. Clearly, therefore, water washing of coated granules to remove the products of chemical insolubilization is not suitable for use on a commercial scale. It would be far too expensive.

Additionally, water washing of color coated granules at this stage during the manufacture thereof is to be avoided since it causes a reduction of the color intensity of surface coatings, as compared to that intensity of color exhibited by granules prepared according to this invention.

One of the main objects of this invention, therefore, is to provide a method whereby color coated granules of desired properties for decorative and protective sheeting may be prepared in a very economical manner, without resorting to conventional water washing or other expedients of commercially prohibitive expense. A further object is to substantially remove the water-soluble by-products of chemical insolubilization from granule coatings, and to do this inexpensively and without loss of color.

These and other objects and advantages are accomplished by mixing chemically insolubilized, surface coated granules with certain chemically-inert organic particulate materials, such as hereinafter more fully described, in the presence of a small amount of water, and thereafter blowing or otherwise separating the particulate material from the granules, leaving their coatings substantially free of deleterious water-soluble constituents, and with improved asphalt adhesion, resistance to blooming and weathering, etc. Such a result is accomplished with surprisingly small amounts of water, such as would be entirely insufficient for normal water washing. The water soluble constituents on or in a granule surface coating after treatment according to this invention are reduced to less than about 2 pounds per ton of granules, which is insufficient to interfere with the desired properties of the granules, whereas present day commercially prepared roofing granules generally contain more than double that amount.

Aside from the fact that water soluble constituents on roofing granules may be conveniently removed without incurring great expense according to this invention, there also is gained a surprising improvement with respect to the intensity of color exhibited by surface colored granules. This becomes particularly evident when one compares granules prepared by our process with those produced in an identical manner in all respects except that water washing is employed instead of the organic particulate mixing and removal steps of this invention. Quite possibly water washing may cause significant bleaching of the colored granule coatings, or cracking or scuffing thereof, or significant removal of pigments—results which are avoided when one follows the "dry washing" method hereof.

In the illustrative drawing, made a part hereof, Figure 1 is a cross-sectional view of a roofing granule prepared as taught herein; and Figure 2 is a flow sheet of the main steps of the process hereof.

In preparing roofing granules according to this invention, crushed mineral material is first warmed to a temperature between approximately 90 and 180° F., and then mixed with a fluid film-forming slurry containing a pigment and water soluble alkali silicate binder in a suitable mixer, e.g., an ordinary concrete mixer or tumbling barrel type, until the granules are coated with a thin layer of silicate binder containing the desired pigment. Toward the end of the mixing operation, a stream of air is passed for about 2 to 10 minutes through the mixing apparatus so as to partially dry the coated granules, after which they are dried with a minimum of agitation at a temperature above 250° F. and below 600° F., preferably about 400° F., in a rotary kiln, as well known in the art. At this raised temperature the coating is more completely dehydrated and becomes dense, rigid and abrasion-resistant.

After drying, and while the granules are still at a somewhat raised temperature, usually about 180° to 380° F., a water solution of an acidic pickling compound is applied to them, as by spraying, in order to insolubilize the soluble silicate coating. Water soluble products formed as a result of this chemical pickling step, while such products are maintained in concentrated water solution, are then removed by mixing the granules, preferably while they are still warm, in intimate contact with a particulate inert absorptive cellulosic material. The particulate cellulosic material absorbs much of the water about the granules, as well as the water soluble products formed during the pickling operation, and is then removed from the granules by directing air currents through the mixture while mixing the same. The heat of the granules, of course, causes continual evaporation of water during the process. Aeration to remove the organic particulate also serves to further dry the granules. Thereafter the dried coated granules may be treated with paraffin oil or linseed oil, or given an adhesion treatment using materials such as disclosed in Patent 2,595,465 to Keene et al., or given any other treatment known to the art.

The greater part, if not all, of the added organic particles can be easily separated and removed from the granules by aeration; however, it may be desired, in some instances, to remove any last traces by screening the finished granules, either before or after treating them with paraffin oil or other materials. Suitable screening to remove traces of organic particulate may be accomplished by placing the granules on a screen of a mesh size smaller than the granule size, and vibrating the same.

Various mineral materials may be crushed and used as a base granule upon which a coating is applied. Nonporous rocks or minerals such as argillite or greystone (found in large deposits near Wausau, Wisconsin), greenstone, certain granites, etc., are preferred materials, but other minerals such as traprocks and slates are also suitable. The raw material, whether pervious or impervious, is crushed to a particulate size between approximately 10 and 35 mesh, e.g., so as to pass a 10 mesh screen and be retained on a 35 mesh screen.

Aqueous sodium silicate is the preferred alkali silicate to employ, due to its availability and economy, although equivalent materials such as potassium silicate, may likewise be used. The preferred grade of sodium silicate has a ratio of $Na_2O$ to $SiO_2$ of 1:2 up to 1:3.25, e.g., a silicate having a ratio of $Na_2O$ to $SiO_2$ of 1:2.84, a gravity of 47° Baumé, and a solids content of 40–42%. A commercial example of sodium silicate of this type is the "K" brand of Philadelphia Quartz Company. Variations in the alkalinity of the silicate are permissible but the higher alkalinities are generally to be avoided inasmuch as they require increased amounts of pickling compounds for insolubilization of the coating. Increased $SiO_2$ content, on the other hand, reduces the film-forming properties, as well as attainable concentrations for the silicate. Usually an amount between about 20 to 40 pounds of sodium silicate per ton of granules is employed, but larger amounts are possible to use satisfactorily.

Many different types of pigments and mixtures may be used to impart color to a granule coating. Examples of suitable pigments are ultramarine blue, phthalocyanine green (a highly heat sensitive organic pigment), chromium oxide, etc.

Chemical insolubilization of a low temperature silicate set coating (see for an illustrative example, Buzzell et al. Patent 2,614,051) may be accomplished by using singly, or in combination, any of a wide variety of acidic pickling compounds, e.g., ammonium chloride, aluminum chloride, hydrochloric acid, calcium chloride, aluminum sulfate, magnesium chloride, etc. Any suitable acidic pickling compound which insolubilizes the silicate coating on a granule has been found satisfactory for use in practicing this invention.

Generally, the quantity of pickling compound used to insolubilize a silicate coating by reacting with the alkali portion thereof is approximately the theoretical amount required to neutralize the coating on the granules. This amount may be determined by estimating the approximate amount of alkali in a coating and then calculating the equivalent amount of a particular acidic pickling compound needed to neutralize the same. In general, amounts will range between 2 and 10 pounds of pickling compound per ton of coated granules, and the compound is applied to the granules as a water solution.

Inert organic particulate materials which we may use include many inexpensive, low-density, cellulosic, waste materials, such as for example ground corn cobs, sponge particles, sawdust or pulverized wood known as wood flour, etc. Because of the low cost of these materials, it is frequently more economical to throw them away after a single use rather than to clean them for repeated use. They are preferably used in a particle size of minus 40 mesh, i.e., so as to pass a 40 mesh screen, and may be used in sizes as small as approximately 200 mesh, or smaller, if desired. Removal of these small particles is readily accomplished by aeration. It is also possible to use particle sizes larger than the size of the granules, for example ¼" particles, but we prefer to use the finer material, e.g. smaller than 40 mesh, as a smaller amount of such fine material is needed to accomplish equivalent results, and the rate of absorption of water soluble constituents from the granule surfaces is greater.

It should be particularly noted that we employ organic materials, preferably of a porous cellulosic nature, in our process. Inorganic materials such as clays, diatomaceous earths, etc., have not been found to be suitable. They cling to the granule surfaces, mask out desired color effects, and cannot be removed satisfactorily from the granules by any practicable means.

After chemical insolubilization, between about 20 and 100 pounds, preferably 20 to 60 pounds, of organic material per ton of granules is mixed for at least 2 or 3 minutes with the granules while they are in the presence of an amount of water at least sufficient to dampen their surfaces, usually at least about 20 and up to about 100 pounds, preferably 20 to 60 pounds, of water per granule ton. The granules at this point are usually above room temperature and may be at a temperature as high as about 250° F. The quantity of water necessary to use varies largely according to the heat content of granules at the time of treatment, higher temperature granules requiring slightly greater amounts of water since greater amounts are evaporated during treatment. However, only the necessary small amount of water required to dampen the granule surfaces and keep the products of chemical insolubilization in a concentrated solution need be used. Most of the water applied during chemical insolubilization is, of course, evaporated from the granules shortly after this insolubilization treatment, due to the heat of the granules. However, if the amount of water used in chemical insolubilization is so large as to leave the granule coatings damp after this treatment, then the amount of water, if any, which need be added for salt removal using organic particulate may be negligible, and in any case need be only that amount which is sufficient to maintain the water content in the approximate range aforenoted. Dissolved water-soluble products of chemical pickling are largely absorbed with water by the particulate cellulosic material, which then is removed from the granules by directing a stream of air through the mixture while agitating the same.

In a less preferred embodiment of this invention, a mixture including the acidic pickling compound and the inert particulate cellulosic material, and approximately 20 to 100 pounds, usually 20 to 60 pounds, of water per granule ton, is applied directly to coated granules after their silicate coating has been set by drying at a raised temperature below about 600° F. This mixture is applied and mixed with the granules while they are still at an elevated temperature, usually not over about 250° F., however, for reasons of safety. In this embodiment, chemical insolubilization and absorption of the products thereof by the cellulosic material is accomplished in fundamentally a single operation. The cellulosic material is then removed by air currents and carries with it a substantial amount of the products of chemical insolubilization as well as much of the water. The remainder of the water is removed by aeration, the heat content of the granules also causing much of the water to evaporate.

The following specific examples are offered to illustrate but not limit the teaching hereof.

*Example 1*

|  | Pounds |
|---|---|
| Granules | 2,000 |
| Chromium oxide | 8 |
| Yellow iron oxide (hydrate) | 3.25 |
| Carbon black | 0.7 |
| Phthalocyanine green paste (20% solids) | 11.2 |
| Sodium silicate solution, 40 to 42% solids 47° Baumé (soda to silicate ratio of 1:2.84) | 25.6 |
| Water | 4.7 |

Ingredients other than the granules were mixed together to form a fluid film-forming slurry which then was coated upon previously warmed granules in a rotary concrete mixer. Granules were fed to the mixer at about 110° F. and mixing was continued until the granules were uniformly coated with the pigment-silicate suspension. Air was circulated through the mixer for about 2 to 5 minutes just before mixing was terminated.

The granules were then transferred to a conventional rotary kiln and heated to 375° F. for about 15 minutes. (As well known in the art, the period of heating will vary according to batch size, size of the kiln, and other factors.) Drying was accomplished with as little agitation as possible to facilitate the formation of a dense, tough surface coating.

From the kiln, the granules were transferred to a rotary cooler, entering the same at about 350 to 375° F. Near the point of entrance of the granules into the rotary cooler, they were sprayed and thoroughly mixed with about 80 pounds of a pickling solution containing about 1.8 pounds of aluminum chloride and about 1.8 pounds of ammonium chloride dissolved in water. Owing to the heat of the granules, much of this water evaporated shortly after application.

Pickling as above is suitably accomplished in a rotary cooler equipped with lifter flights, i.e., sections of angle irons oriented substantially longitudinally or helically on the inner cylindrical surface of a cooler. The cooler may be tilted somewhat from a true horizontal position so as to facilitate movement of granules gradually therethrough. Preferably lifter or mixer flights in the first portion (i.e., first 4 or 5 feet) of the cooler have a relatively small flange portion as compared to those in the latter portion of the cooler. A standard cooler length of about 30 feet has been found suitable for this operation. Such coolers are well known in this art.

From the rotary cooler used in conducting the pickling operation, the granules were transferred to another similar rotary unit of the foregoing type, entering the same at about 150–200° F. In the first portion of this unit, water in the amount of about 30 pounds per ton of granules was added and mixed with the granules so as to wet their surfaces. After only about one minute of mixing in the presence of added water, 40 pounds of maple wood flour per ton of granules was added to the wet granules with continuous slow mixing. The particle size of the maple wood flour was minus 60 mesh. The granules and wood flour were mixed together for about 3 or 4 minutes before a stream of air was directed through the mixture.

In the first 8–10 feet of the unit used to accomplish the above, where low mixing flights were located and where the granules were not raised and dropped through air, the 30 pounds of water needed to wet the granule surfaces was metered out upon the granules. A short distance from the point where water was added, the maple wood flour was metered out upon the granules. Intimate mixing of the added constituents with the granules was accomplished before the granules passed into the portion of the cooler where they were raised and dropped through air for aeration.

During mixing, the wood flour absorbed most of the added water and soluble salts dissolved therein. Aeration served not only to remove the particles of wood flour and absorbed constituents but also aided in drying the granules, leaving them in condition for further treatment as desired.

Granules prepared according to the foregoing were found to contain only about 1.5 pounds of soluble salts per ton. A suitable test to determine the soluble salt content of a granule coating is as follows: Take a known quantity of coated granules and mix them thoroughly with hot water, e.g., at about 180° F., for about 5 to 10 minutes, so as to remove solubles therefrom. Then filter the water and dissolved salts from the granules, evaporate the water, and weigh the residue. By suitable calculation the weight of soluble salts per ton of granules can be determined.

*Example 2*

A one ton quantity of granules, coated and dried in a kiln as set forth in Example 1, were cooled by aeration to about 250° F. and transferred to a conventional rotary unit, as aforedescribed in Example 1, where they were treated with a mixture containing 1.8 pounds of aluminum chloride and 1.8 pounds of ammonium chloride dissolved in 50 pounds of water. Additionally 40 pounds of minus 50 mesh pine wood particles was dispersed in this mixture. The mixture was slowly poured over the granules with continued mixing, so as to disperse the mixture throughout the granules. Some water in the mixture was evaporated as a result of the heat of the granules. After about 4 minutes of mixing, the granules and admixed constituents gradually passed into the lifter flight section of the unit, and were raised and dropped through a countercurrent flow of air. Wood flour and absorbed constituents were blown from the granules by this countercurrent flow of air, and the granules were left in a substantially dry condition, suitable for further treatment as desired, containing only about 1.8 pounds of soluble salts per ton.

Granules of the foregoing examples exhibited very good adhesion to asphalt, high resistance to blooming and weathering, and brilliant color intensity, as described hereinabove. They are well adapted for use as decorative and protective elements for roofing and siding.

That which is claimed is:

1. In a process for making color coated granules of high color intensity, resistance to blooming and weathering, and adhesion to asphalt, the steps of absorbing in a particulate, absorptive, cellulosic organic material of low-density a major proportion of water-dissolved water-soluble products formed as a result of treating a dry, dense, pigment-containing, alkali-silicate coating on mineral granules with a water-solution of an alkali-reactive, acidic pickling compound, said particulate material being admixed with said granules, and directing a stream of air through said granules and admixed particulate material while agitating both said granules and said admixed particulate material so as to remove said particulate material and absorbed constituents from said granules.

2. Artificially colored mineral granules having less than about 2 pounds of water-soluble constituents per ton of coated granules and having a high color intensity coating applied in accordance with the process set forth in claim 1.

3. In a process for making color coated granules of high color intensity, resistance to blooming and weathering, and adhesion to asphalt, the steps of forming at a raised temperature below 600° F. a dry, dense, pigment-containing alkali-silicate coating on mineral granules, applying to said coating, while said granules are at a raised temperature, an alkali-reactive acidic pickling compound dissolved in water, absorbing in a particulate, porous, absorptive cellulosic material of low density a major proportion of water-soluble products of reaction between said alkali silicate coating and said pickling compound, said particulate material being admixed with said granules, and directing a stream of air through said granules and admixed particulate material while agitating both said granules and said admixed particulate material so as to remove said particulate material and absorbed constituents from said granules.

4. In a process for making color coated granules of high color intensity, resistance to blooming and weathering, and improved adhesion to asphalt, the steps of forming at a raised temperature below 600° F. a dry, dense, pigment-containing alkali-silicate coating on mineral granules, applying to said coating, while said granules are at a raised temperature, an alkali-reactive, acidic pickling compound dissolved in water, mixing said granules, while the coated surfaces thereof are wet with water, with a particulate, porous, absorptive cellulosic material of low density so as to absorb a major proportion of the water-dissolved water-soluble products of reaction between said alkali-silicate coating and said pickling compound, and directing a stream of air through said granules and admixed particulate material while agitating both said granules and said admixed particulate material so as to remove said particulate material and absorbed constituents from said granules, said granules being left in a substantially dry condition and with less than approximately 2 pounds of water-soluble material per ton.

5. In a process for making color coated granules of high color intensity, resistance to blooming and weathering, and improved adhesion to asphalt, the steps of forming at a raised temperature below 600° F. a dry, dense, pigment-containing, alkali-silicate coating on mineral granules, mixing said granules, while said granules are at a raised temperature below about 250° F., with a mixture comprising an alkali-reactive, acidic pickling compound dissolved in water, and a particulate, porous, absorptive cellulosic material of low density dispersed therein, said pickling compound causing insolubilization of said coating and said particulate material effecting substantial removal of the water-dissolved water-soluble products of insolubilization by absorbing the same, and directing a stream of air through said granules and admixed particulate material while agitating both said granules and said admixed particulate material so as to remove said particulate material and absorbed constituents from said granules, said granules being left in a substantially dry condition and with less than approximately 2 pounds of water-soluble material per ton.

References Cited in the file of this patent
UNITED STATES PATENTS

| | | |
|---|---|---|
| 703,393 | Edson | July 1, 1902 |
| 1,012,644 | Hutchins | Dec. 26, 1911 |
| 1,154,167 | Boland | Sept. 21, 1915 |
| 2,341,605 | Fabritz | Feb. 15, 1944 |
| 2,595,465 | Keene et al. | May 6, 1952 |
| 2,614,051 | Buzzell | Oct. 14, 1952 |
| 2,776,914 | Faulwetter | Jan. 8, 1957 |